United States Patent
Ho et al.

(10) Patent No.: US 12,464,352 B2
(45) Date of Patent: Nov. 4, 2025

(54) COMMON FRAMES FOR AUTHENTICATION AND ENCRYPTION

(71) Applicant: QUALCOMM Incorporated, San Diego, CA (US)

(72) Inventors: Sai Yiu Duncan Ho, San Diego, CA (US); Jouni Kalevi Malinen, Tuusula (FI); Philip Michael Hawkes, Valley Heights (AU)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 18/183,125

(22) Filed: Mar. 13, 2023

(65) Prior Publication Data

US 2024/0314555 A1    Sep. 19, 2024

(51) Int. Cl.
*H04W 12/06* (2021.01)
*H04W 12/037* (2021.01)

(52) U.S. Cl.
CPC ......... *H04W 12/06* (2013.01); *H04W 12/037* (2021.01)

(58) Field of Classification Search
CPC .............................. H04W 12/06; H04W 12/03
See application file for complete search history.

(56) References Cited

U.S. PATENT DOCUMENTS

| 2014/0050320 A1 | 2/2014 | Choyi et al. | |
| 2015/0271137 A1* | 9/2015 | Seok | H04L 63/0876 370/338 |
| 2016/0081130 A1 | 3/2016 | Wang et al. | |
| 2021/0282007 A1* | 9/2021 | Ho | H04W 12/041 |
| 2022/0386117 A1* | 12/2022 | Henry | H04W 12/06 |
| 2024/0298174 A1* | 9/2024 | Rajadurai | H04W 12/06 |

OTHER PUBLICATIONS

Duncan Ho (Qualcomm), Hereinafter Ho: "Association protection", IEEE Draft; 11-22-0463-00-00BI-ASSOCIATION-PROTECTION, IEEE-SA Mentor, Piscataway, NU USA, vol. 802.11bi Mar. 9, 2022 (Mar. 9, 2022), pp. 1-16, XP068189446, Retrieved from the Internet: URL:https://mentor.ieee.org/802.11/den/ 22/11-22-0463.*
Ho D (Qualcomm)., et al., "(Re) Association protection for 11bi", IEEE Draft, 11-22-0463-00-00BI-Association Protection, IEEE-SA Mentor, Piscataway, NJ USA vol. 802.11bi, Mar. 9, 2022, pp. 1-16, XP068189446, p. 6.
International Search Report and Written Opinion—PCT/US2024/012992—ISA/EPO—May 6, 2024.

* cited by examiner

*Primary Examiner* — Frantz B Jean
(74) *Attorney, Agent, or Firm* — Arent Fox, LLP and Qualcomm, Incorporated

(57) ABSTRACT

This disclosure provides methods, devices, and systems for lightweight, low-latency authentication and association between STAs and APs in wireless local area networks (WLANs). In various aspects, an apparatus may transmit, over a WLAN prior to authentication by an access point (AP), a first Extensible Authentication Protocol Over a Local Area Network (EAPoL) frame including first information associated with an EAPoL protocol and second information associated with an encryption protocol. The apparatus may further receive, over the WLAN, a second EAPoL frame indicating successful authentication by the AP in accordance with the EAPoL protocol, the second EAPoL frame including third information associated with the encryption protocol.

30 Claims, 12 Drawing Sheets

COMMON FRAMES FOR AUTHENTICATION AND ENCRYPTION

TECHNICAL FIELD

This disclosure relates generally to wireless communication, and more specifically, to authentication of devices and encryption of information in wireless networks.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In order to successfully perform network attachment, an STA may be authenticated by an AP. The STA may establish its identity with the AP during such an authentication process. In addition to authentication of the STA, the STA may associate (e.g., register) with the AP. The association process may provide an opportunity for the AP to record information about the STA, and such recorded information may enable the AP to successful deliver frames to the STA.

As both the authentication and association processes involve the exchange of a number of messages, a non-negligible amount of overhead (in terms of latency) may occur before an AP and an STA are able to exchange any substantive data. Moreover, some or all of the messages exchanged for the foregoing processes may be unencrypted, and therefore may expose sensitive information about the STA and/or the AP when such messages are the network. Thus, communication between APs and STAs in WLANs may benefit from some enhancements that reduce latency and/or reduce stress.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a station (STA) or one or more components thereof and may include transmitting, over a wireless local area network (WLAN) prior to authentication by an access point (AP), a first Extensible Authentication Protocol Over a Local Area Network (EAPoL) frame including first information associated with an EAPoL protocol and second information associated with an encryption protocol. The method may further include receiving, over the WLAN, a second EAPoL frame indicating successful authentication by the AP in accordance with the EAPoL protocol. The second EAPoL frame may include third information associated with the encryption protocol.

Another innovative aspect of the subject matter described in this disclosure can be implemented as a method of wireless communication. The method may be performed by an AP and may include receiving, over a WLAN prior to authentication of an STA, a first EAPoL frame including first information associated with an EAPoL protocol and second information associated with an encryption protocol. The method may further include transmitting, to the STA over the WLAN, a second EAPoL frame indicating successful authentication of the STA in accordance with the EAPoL protocol. The second EAPoL frame may include third information associated with the encryption protocol.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
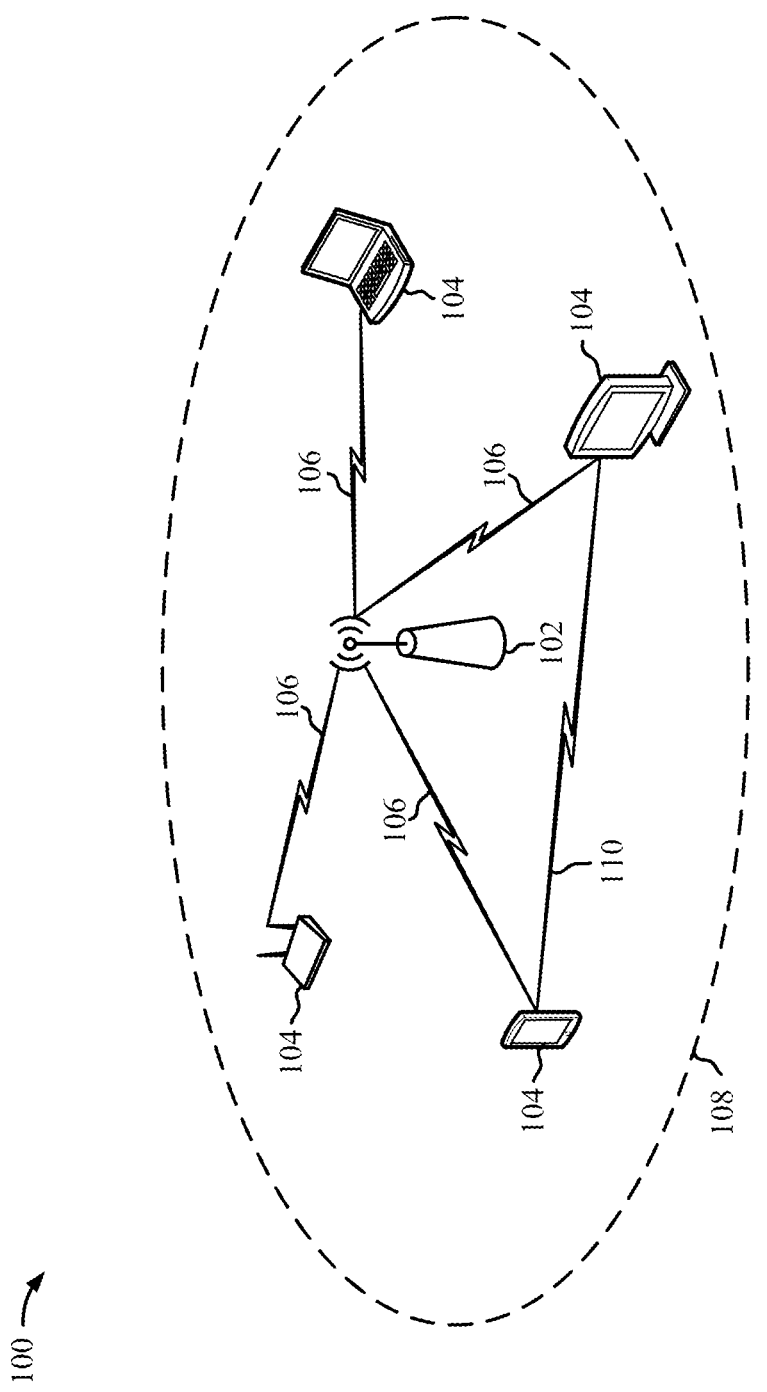
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

In many wireless communications standards, such as IEEE 802.11, established and widely adopted WLAN communication protocols include various mechanisms to protect data privacy, security, protection, and so forth. Such protocols may include authentication protocols and encryption protocols, among others. An example of an authentication protocol may include IEEE 802.1X with the Extensible Authentication Protocol (EAP), which may provide an authentication framework that the IEEE 802.11 standards adopt. IEEE 802.1X delineate EAP encapsulation over local area networks (LANs), referred to as EAP over LAN or EAPoL. The EAPoL protocol may enable an AP to validate the identity of an STA before permitting the STA network access. In an implementation of EAPoL, 802.1X EAP frames may be carried via 802.11 Authentication frames.

An example of an encryption protocol may include the Pre-Association Security Negotiation (PASN) protocol. The PASN protocol may facilitate authentication, encryption, and integrity of messages carried in particular 802.11 frames, e.g., where such protection is warranted. Whether such protection is warranted may be negotiated via security parameters exchanged in connection with those particular 802.11 frames. The information exchanged pursuant to PASN may be carried via 802.11 Authentication frames and/or Public Action frames.

Multiple protocols may be implemented for a particular exchange of frames, such as an association procedure between an STA and an AP. However, the implementations of the multiple protocols may be sequentially performed—e.g., one set of frames may be exchanged for one protocol, and after the exchange of the one set of frames is complete, another set of frames may be exchanged for another protocol. Such an approach may appreciably increase overhead commensurate with some frame exchanges. For example, the network load may be increased due to the additional frames, and latency may be increased due to the discrete frame exchanges.

Various aspects of the present disclosure relate generally to authentication and encryption of signaling, and more specifically, to the encryption of information exchanged during an association procedure between an STA and an AP. As earlier described, 802.1X EAP frames may be carried via 802.11 Authentication frames, e.g., in order to authenticate an STA according to the 802.1X protocol prior to association by the STA. Moreover, the PASN protocol or a variation thereof, such as Extended PASN (EPASN) (further described, infra), may be implemented to protect (e.g., encrypt and authenticate to provide for data security, data privacy, data integrity, and so forth) 802.11 Association frames and improve user privacy—for example, exposure of private information carried in Association Request and Association Response frames may be avoided, even when sent in the clear). As further described by the present disclosure, some EPASN information for encryption of 802.11 Association frames and some 802.1X parameters may be combined together in a frame.

Particular implementations of the subject matter described in this disclosure can be implemented to realize one or more of the following potential advantages. Techniques described herein may reduce the signaling overhead incurred during authentication and association procedures, such as those in which an encryption protocol is used to protect the Association frames that otherwise may have been sent in the clear. For example, aspects of the present disclosure provide for inclusion, aggregation, or combination of some EPASN information into one or more 802.1X EAP frames. Illustratively, EPASN information may be prepended, appended, and/or inserted into a body, data field, payload, and/or header of one or more 802.1X EAP frames, and/or an EPASN PDU may be encapsulated, packetized, or otherwise adapted to be carried in an authentication frame that further carries other information associated with the EAPoL authentication process. Thus, fewer frames may be exchanged for authentication and encryption prior to association between an STA and an AP. In practical effect, the reduction in the number of frames exchanged for authentication and encryption may reduce the signaling overhead, thereby reducing load on the network.

Another potential advantage of the subject matter described herein is reduced latency. By configuring some 802.1X EAP frames to carry some EPASN information, an encryption key may be generated earlier in time relative to existing approaches in which the authentication with EAPoL is completed prior to the exchange of any EPASN frames. By extension, the relatively earlier availability of the encryption key facilitates relatively earlier encryption of the information carried in Association frames, and so an association procedure may also be completed relatively earlier in time. Effectively, the latency introduced by encryption of portions of Association frames may be mitigated through contemporaneous communication of EAPoL information and EPASN information.

FIG. 1 shows a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an AP 102 and multiple STAs 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a MAC address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHZ, 6 GHZ or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHZ band, the 3.6 GHz band, and the 700 MHz band. Some implementations of the APs 102 and STAs 104 described herein also may communicate in other frequency bands, such as the 6 GHZ band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHZ or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHZ, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
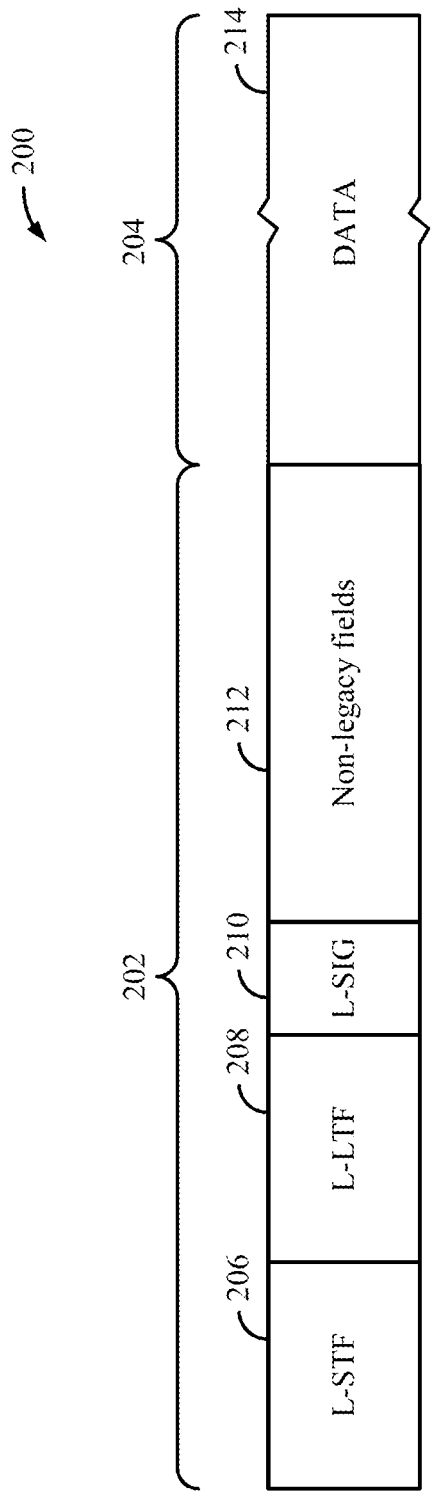
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

In some aspects of the present disclosure, at least one of the preamble 202 and/or the payload 204 may be configured for 802.1X authentication with EAPoL, and EPASN parameters associated with encryption may be aggregated therewith. For example, the payload 204 of the PDU 200 may carry an 802.1X EAP frame, as well as EPASN information. The EPASN information may be inserted in the 802.1X EAP frame (e.g., in the body or data field), or the EPASN information may be prepended or appended to the 802.1X EAP frame.

Figure 2B:
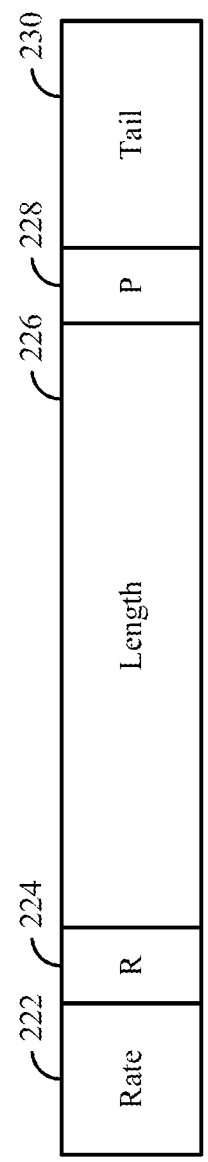
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. For example, the data rate field 222 may indicate a data rate associated with the aggregate of the 802.1X EAP frame and the EPASN information (e.g., carried in the payload 204), and similarly, the length field 226 may indicate a length of the aggregate of the 802.1X EAP frame and EPASN information. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
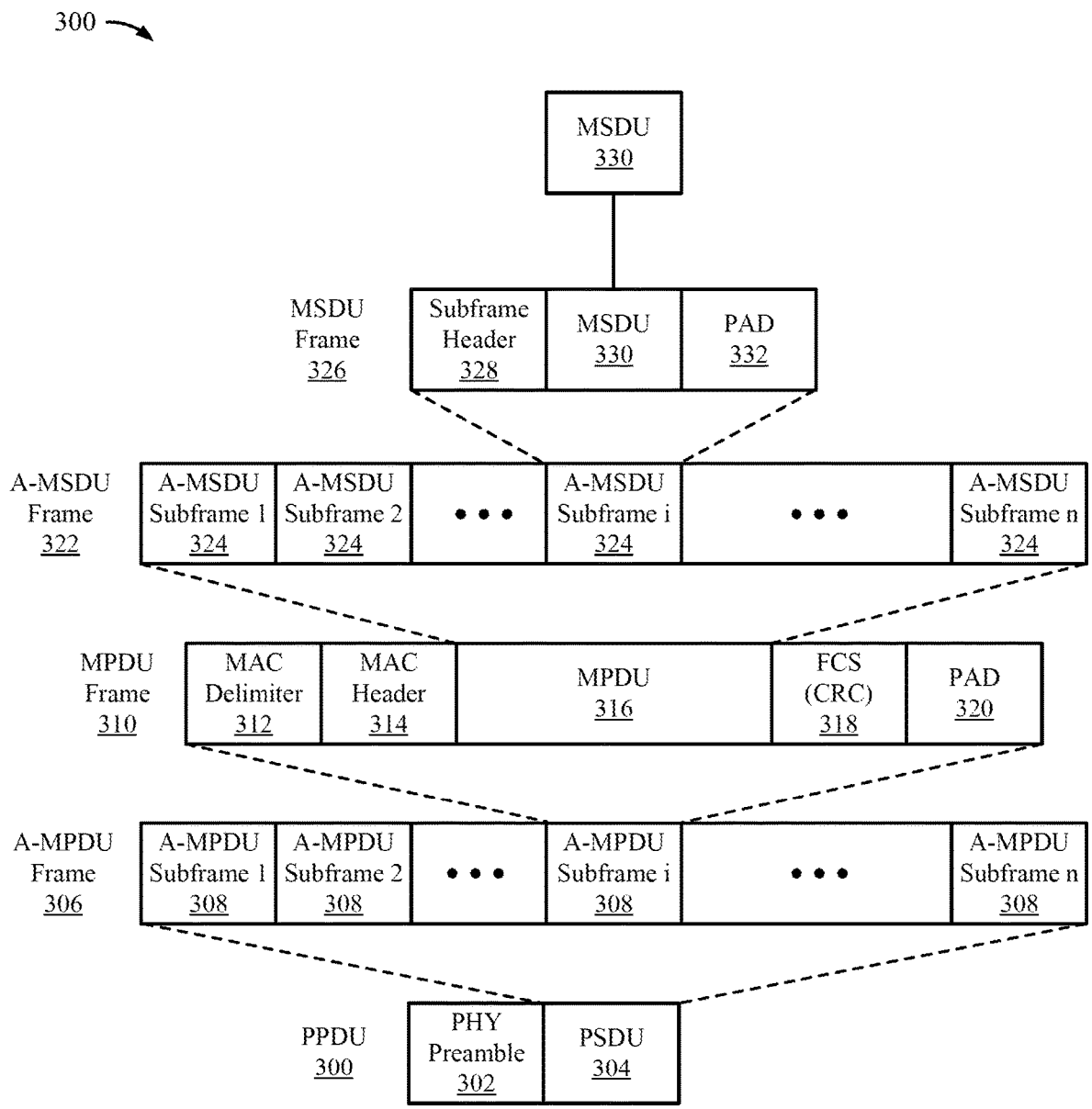
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which includes the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

In some aspects of the present disclosure, the MPDU frame 310 may be configured for 802.1X authentication with EAPoL. According to some implementations, the MPDU frame 310 may be type of 802.11 frame, such as an 802.11 Management (MGMT) frame of the authentication subtype. Such an 802.11 Authentication frame may be configured as an 802.1X EAP frame, and EPASN parameters associated with encryption may be inserted into such an MPDU frame 310. For example, EPASN information may be inserted in, prepended to, or appended to an MPDU 316 of an MPDU frame 310 configured as an 802.1X EAP frame.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the MPDU 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the MPDU 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
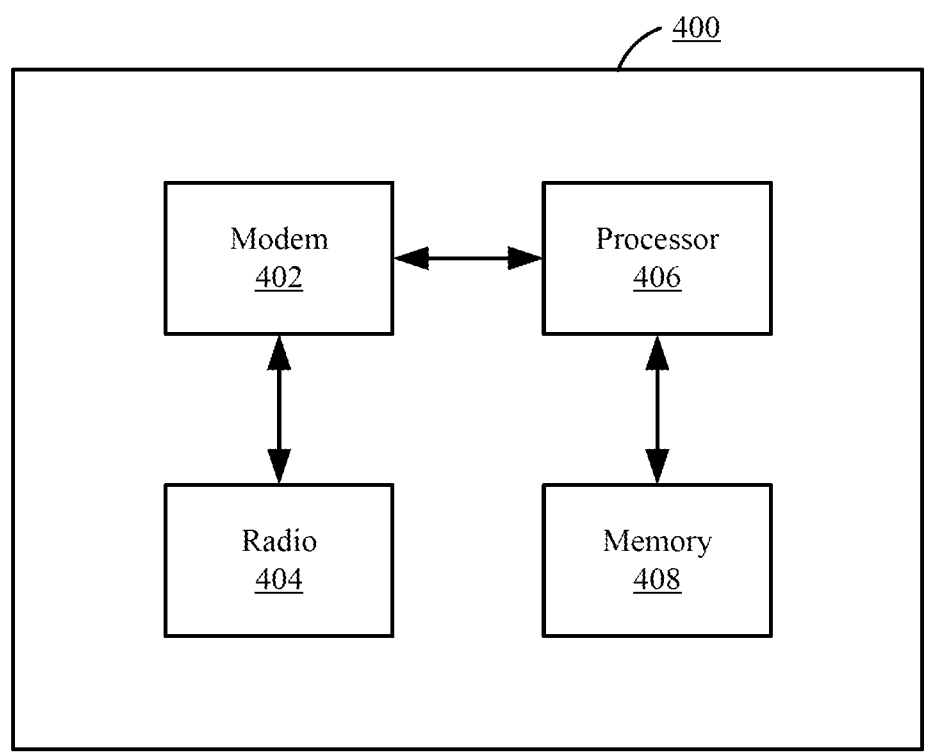
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device 400 can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively, "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
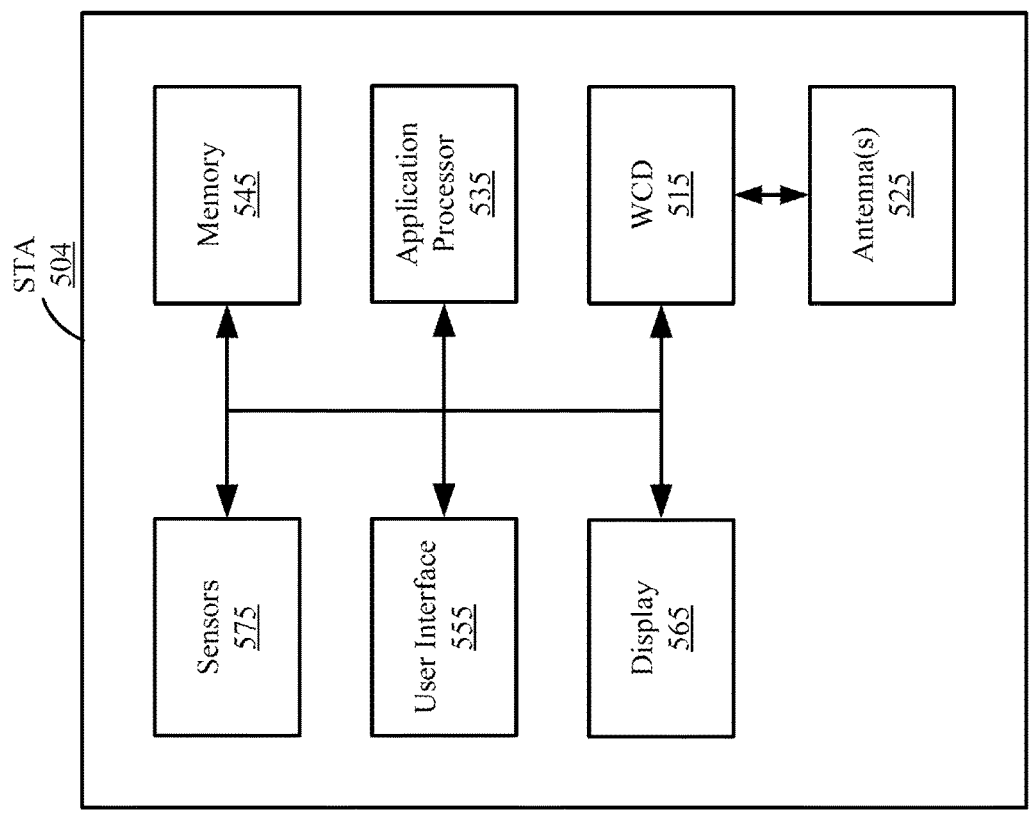
FIG. 5B shows a block diagram of an example STA.
Figure 5A:
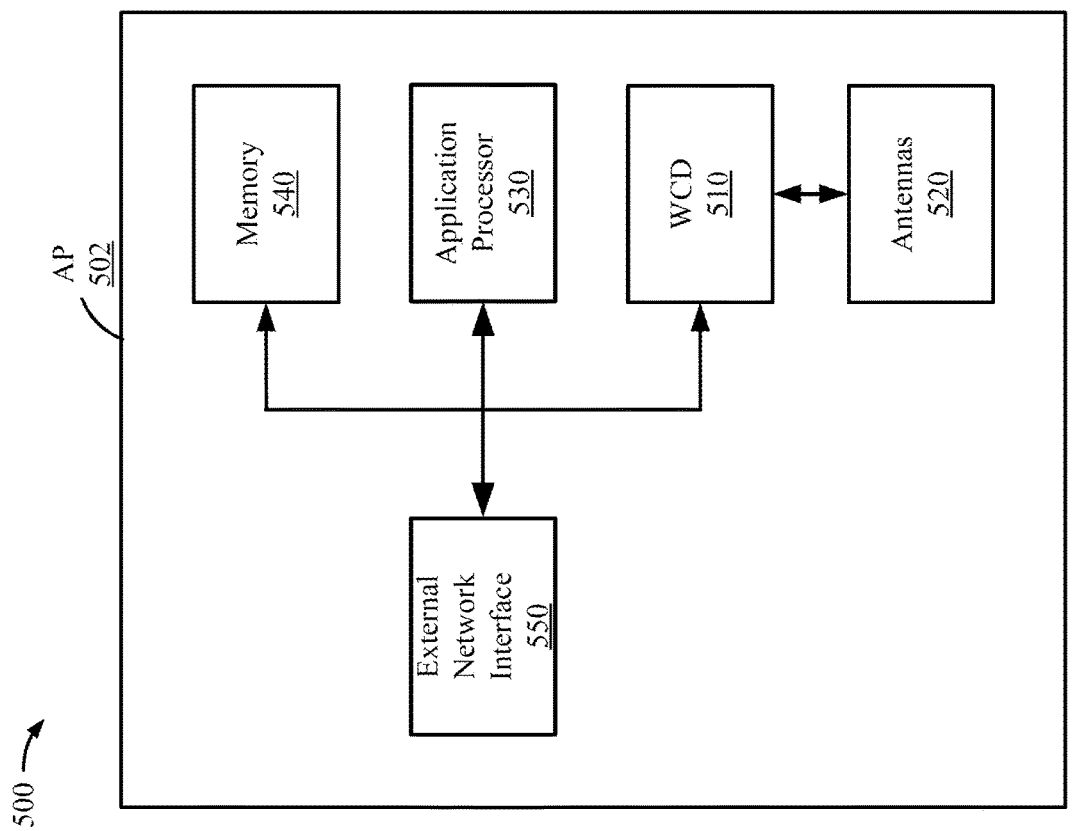
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Various aspects described herein relate generally to authentication and encryption prior to association between STAs and APs in WLANs, and more particularly, to lightweight, efficient, flexible, and extensible mechanisms for wireless communication of encryption parameters associated with EPASN. More specifically, both an STA and an AP may be configured to include encryption parameters in 802.1X EAP frames used for authentication. Such encryption parameters may be used to generate encryption keys that the STA and the AP may use to encrypt and/or decrypt information carried in Association frames that are exchanged during an association procedure.

Figure 6:
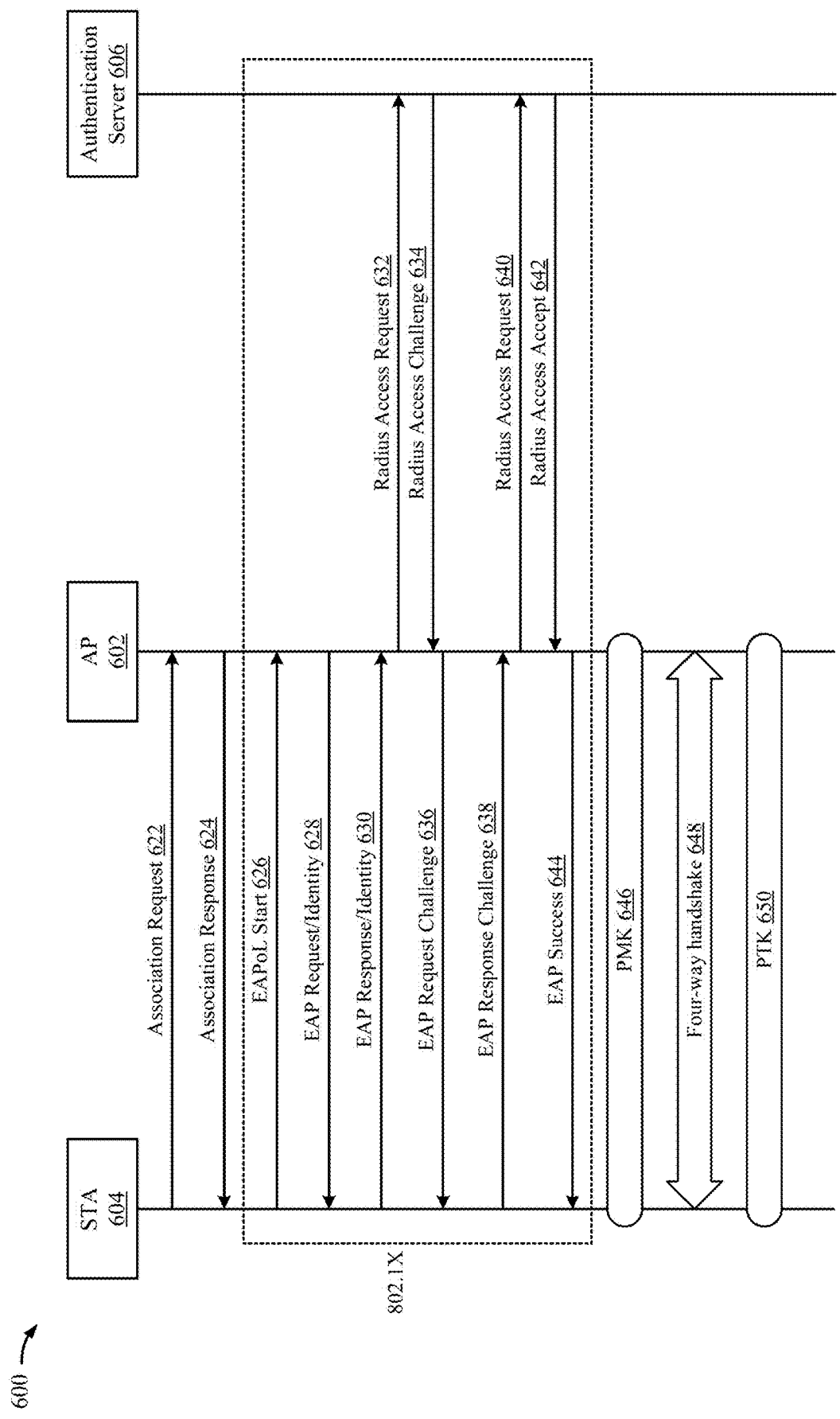
FIG. 6 shows a sequence diagram depicting an example communications flow between an STA and an AP for authentication and association in a wireless local area network (WLAN).

FIG. 6 shows a sequence diagram depicting an example communications flow 600 between an STA 604 and an AP 602 for authentication and association in a WLAN. In some implementations, the AP 602 may be one example of the AP 102 of FIG. 1 or the AP 502 of FIG. 5A. In some implementations, the STA 604 may be one example of any of the STAs 104 of FIG. 1 or the STA 504 of FIG. 5B.

In the illustrated aspect, the STA 604 may initiate an association procedure with an AP 602 by transmitting an association request 622 to the AP 602. The association request 622 may include an 802.11 Association Request frame. The AP 602 may respond to the association request 622 by transmitting an association response 624 to the STA 604. The association response 624 may include an 802.11 Association Response frame.

In some aspects, the STA 604 may both be associated with and authenticated by the AP 602 in order to communicate on a WLAN through the AP 602. The authentication procedure may be implemented via 802.1X authentication with EAPoL. The STA 604 may begin the authentication procedure by transmitting an EAPoL Start frame 626 to the AP 602. The EAPoL Start frame 626 may be implemented as an 802.11 Authentication frame.

In response to the EAPoL Start frame 626, the AP 602 may transmit an EAP Request Identity frame 628 to the STA 604. The EAP Request Identity frame 628 includes a request for the STA 604 to provide information identifying the STA 604. Upon receiving the EAP Request Identity frame 628, the STA 604 may transmit an EAP Response Identity frame 630 to the AP 602. The EAP Response Identity frame 630 may include information identifying the STA 604 for authentication, such as a username or other outer identity information.

The AP 602 may relay information in the EAP Response Identity frame 630 to an authentication server 606 via a remote authentication dial-in user service (RADIUS) Access Request 632. The authentication server 606 may be a RADIUS server that maintains a database of user profiles and centralizes authentication and authorization for users connecting to the WLAN. The authentication server 606 may use the identity information in the RADIUS Access Request 632 to search a user database, and if an entry is found corresponding to the identity information, the authentication server 606 may encrypt a password in the corresponding entry with a message-digest (MD5) challenge. The authentication server 606 may include the MD5 challenge in a RADIUS Access Challenge 634 that the authentication server 606 transmits to the AP 602.

The AP 602 may relay the MD5 challenge to the STA 604 in an EAP Request Challenge 636. The STA 604 may use the received MD5 challenge to encrypt an STA-accessible password, which the STA 604 may transmit to the AP 602 in an EAP Response Challenge 638. The AP 602 may relay the MD5 challenge-encrypted password to the authentication server 606 in a RADIUS Access Request 640. Upon receiving the RADIUS Access Request 640, the authentication server 606 may compare received encrypted password with its own MD5 challenge-encrypted password for the STA 604 and, if the two passwords are identical, the authentication server 606 authenticates the STA 604 and transmits a RADIUS Access Accept 642 to the AP 602.

In response to receiving the RADIUS Access Accept 642, the AP 602 may set a controlled port for the STA 604 in an authorized state so that the STA 604 is permitted to access the WLAN, and the AP 602 may transmit an EAP Success frame 644 to the STA 604 indicating such permission.

The STA 604 and the AP 602 further establish a pairwise master key (PMK) 646. In addition, the STA 604 and the AP 602 perform a four-way handshake 648, e.g., according to the IEEE 802.11 standard. Using the PMK 646 and via the four-way handshake 648, the STA 604 and the AP 602 may further establish a pairwise transient key (PTK) 650, which the STA 604 and the AP 602 may use to secure data via encryption.

Figure 7:
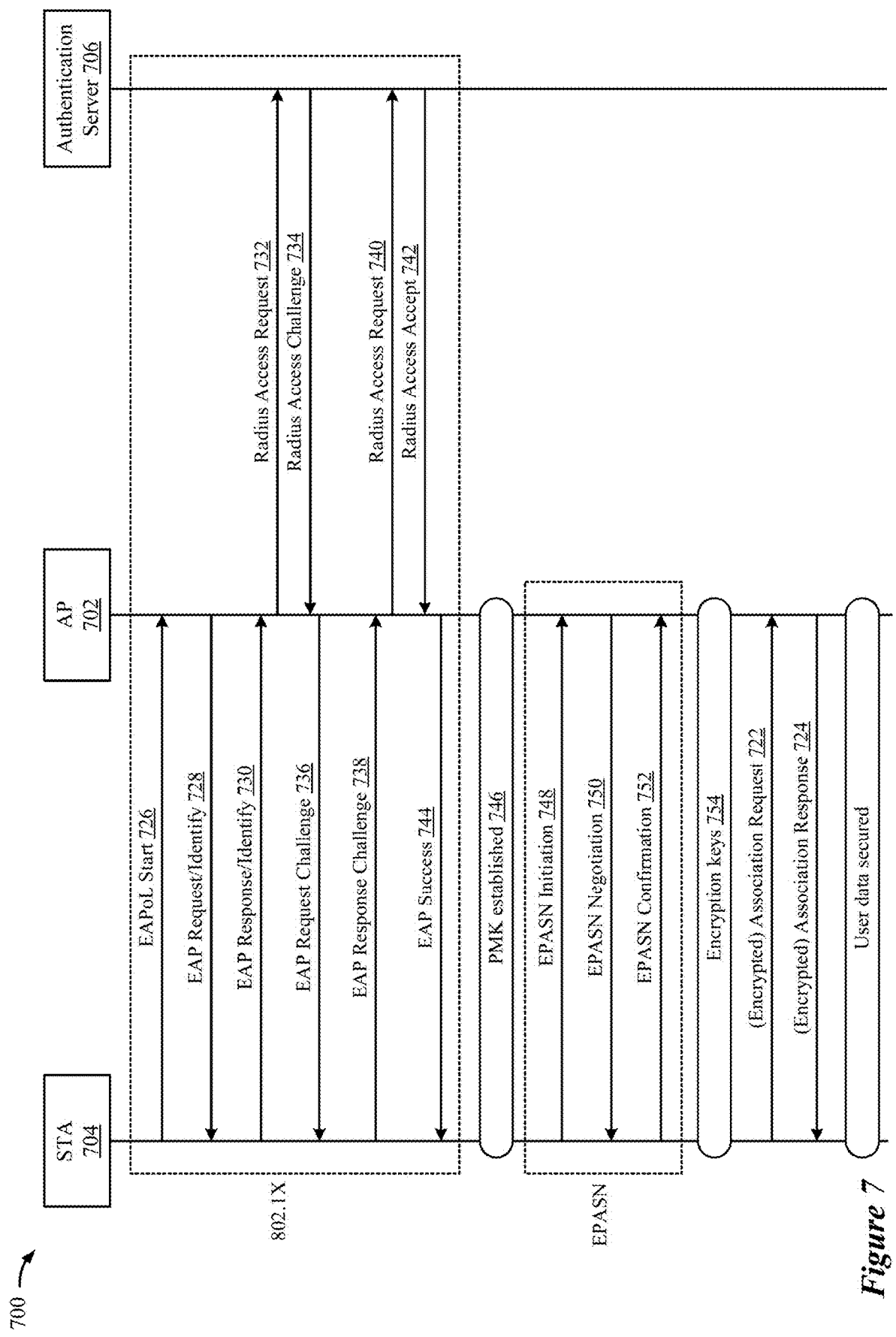
FIG. 7 shows a sequence diagram depicting an example communications flow between an STA and an AP for authentication and association with encryption in a WLAN.

FIG. 7 shows a sequence diagram depicting an example communications flow 700 between an STA 704 and an AP 702 for authentication and association with encryption in a WLAN. In some implementations, the AP 702 may be one example of the AP 102 of FIG. 1, the AP 502 of FIG. 5A, or the AP 602 of FIG. 6. In some implementations, the STA 704 may be one example of any of the STAs 104 of FIG. 1, the STA 504 of FIG. 5B, or the STA 604 of FIG. 6.

As shown in FIG. 6, encryption keys (e.g., the PMK and PTK) may be established after an association procedure. Consequently, the Association frames exchanged during such a procedure may be unencrypted. The lack of encryption may leave information (e.g., user data) carried in the Association frames vulnerable to unauthorized systems and devices, particularly when Association frames are transmitted in the clear.

FIG. 7 illustrates a mechanism for protecting information in the Association frames through encryption. In particular, 802.1X authentication may be performed prior to the association procedure. Thus, the STA 704 may transmit an EAPoL Start frame 726 to the AP 702. In response to the EAPoL Start frame 726, the AP 702 may transmit an EAP Request Identity frame 728 to the STA 704. Upon receiving the EAP Request Identity frame 728, the STA 704 may transmit an EAP Response Identity frame 730 to the AP 702.

The AP 702 may relay information in the EAP Response Identity frame 730 to an authentication server 706 via a RADIUS Access Request 732. The authentication server 706 may use the identity information in the RADIUS Access Request 732 to search a user database, and if an entry is found corresponding to the identity information, the authentication server 706 may encrypt a password in the corresponding entry with an MD5 challenge. The authentication server 706 may include the MD5 challenge in a RADIUS Access Challenge 734 that the authentication server 706 transmits to the AP 702.

The AP 702 may relay the MD5 challenge to the STA 704 in an EAP Request Challenge 736. The STA 704 may use the received MD5 challenge to encrypt an STA-accessible password, which the STA 704 may transmit to the AP 702 in an EAP Response Challenge 738. The AP 702 may relay the MD5 challenge-encrypted password to the authentication server 706 in a RADIUS Access Request 740. Upon receiving the RADIUS Access Request 740, the authentication server 706 may compare received encrypted password with its own MD5 challenge-encrypted password for the STA 704 and, if the two passwords are identical, the authentication server 706 authenticates the STA 704 and transmits a RADIUS Access Accept 742 to the AP 702.

In response to receiving the RADIUS Access Accept 742, the AP 702 may set a controlled port for the STA 704 in an authorized state so that the STA 704 is permitted to access the WLAN, and the AP 702 may transmit an EAP Success frame 744 to the STA 704 indicating such permission.

The STA 704 and the AP 702 further establish a PMK 746. Rather than the abovementioned four-way handshake, however, the STA 704 and the AP 702 may establish an encryption key via the PASN protocol or a variation thereof. For example, the STA 704 and the AP 702 may implement EPASN. According to the EPASN protocol, the AP 702 may beacon with base authentication and key management (AKM) parameters as well as EPASN AKM parameters. When the STA 704 receives such a beacon, the STA 704 may transmit an EPASN Initiation frame 748 to the AP 702.

The EPASN Initiation frame 748 may be an 802.11 Authentication frame, similar to a first PASN frame (e.g., configured to carry the same PASN parameters), but identifying the protocol variation as "EPASN" rather than "PASN." For example, the STA 704 may include a first ephemeral public key, which may match a private key generated by the STA 704, in the EPASN Initiation frame 748. The AP 702 may receive the EPASN Initiation frame 748, and the AP 702 may respond with an EPASN Negotiation frame 750 that includes a second ephemeral key (or temporal key) of the AP 702, for which the AP 702 may have generated a matching private key, as well as base AKM parameters (if relevant).

Provided the information included in the EPASN Negotiation frame 750, in conjunction with the information included in the EPASN Initiation frame 748, the STA 704 may generate a PTK and a key encrypting key (KEK) (collectively, encryption keys 754). Further, the STA 704 may transmit an EPASN Confirmation frame 752 to the AP 702 that serves as a confirmation or acknowledgement of the EPASN key exchange. As with the foregoing EPASN frames 748, 750, the EPASN Confirmation frame 752 may include an 802.11 Authentication frame. Upon receiving the EPASN Confirmation frame 752, the AP 702 may correspondingly derive the encryption keys 754, including the PTK and the KEK.

Having established the encryption keys 754 via EPASN, the STA 704 and the AP 702 may be configured to perform the association procedure with encrypted frames. Thus, the STA 704 may encrypt, and transmit to the AP 702, an association request 722. In response, the AP 702 may encrypt, and transmit to the STA 704, an association response 724. Accordingly, the STA 704 and the AP 702 may securely exchange user data.

Figure 8:
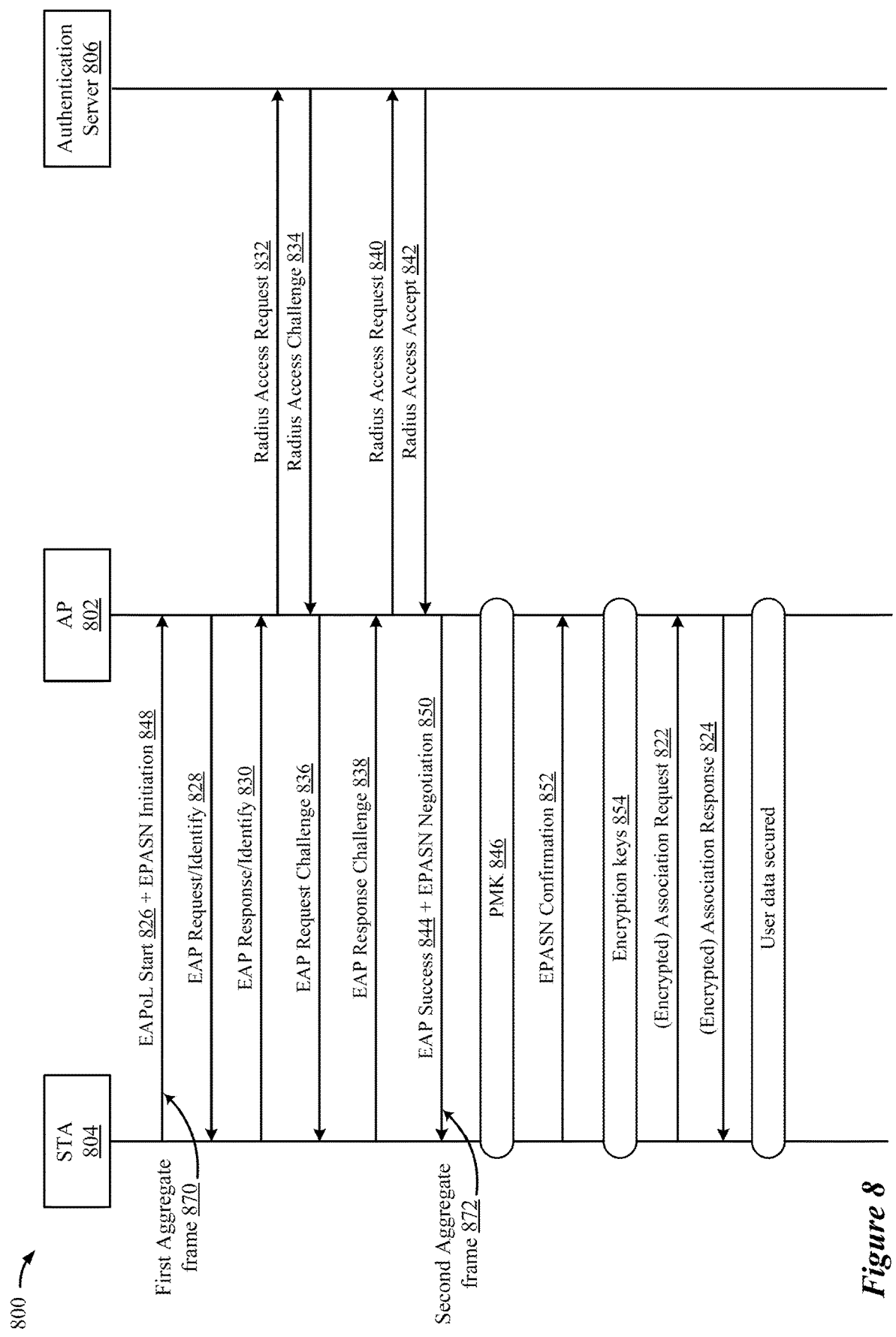
FIG. 8 shows a sequence diagram depicting another example communications flow between an STA and an AP for authentication and association with encryption in a WLAN.

FIG. 8 shows a sequence diagram depicting another example communications flow 800 between an STA 804 and an AP 802 for authentication and association with encryption in a WLAN. In some implementations, the AP 802 may be one example of the AP 102 of FIG. 1 or the AP 502 of FIG. 5A. In some implementations, the STA 704 may be one example of any of the STAs 104 of FIG. 1 or the STA 504 of FIG. 5B.

As shown in FIG. 6, encryption keys (e.g., the PMK and PTK) may be established after an association procedure, which may render information (e.g., user data) carried in the Association frames vulnerable to unauthorized systems and devices, particularly when Association frames are transmitted in the clear. FIG. 7 illustrates a mechanism that sought to protect the information in the Association frames through encryption. However, such a mechanism introduces some degree of latency due to the discrete and sequential order of performing the authentication procedure and the encryption procedure. FIG. 8 describes a mechanism for protecting the information in the Association frames through encryption while mitigating the latency incurred through doing so. In particular, 802.1X authentication and EPASN encryption may be contemporaneously performed.

At the outset, the STA 804 may generate a first aggregate frame 870 that includes an EAPoL Start frame 826 and further includes EPASN Initiation frame 848. For example, the first aggregate frame 870 may be an 802.11 Authentication frame configured as an EAPoL Start frame and also including EPASN parameters that may be the same as or similar to a first PASN frame (e.g., including base AKM parameters, a first ephemeral public key for which the STA 704 generates a matching private key, etc.), but identifying the protocol variation as "EPASN" rather than "PASN." In response to the EAPoL Start frame 826, the AP 802 may transmit an EAP Request Identity frame 828 to the STA 804. Upon receiving the EAP Request Identity frame 828, the STA 804 may transmit an EAP Response Identity frame 830 to the AP 802.

The AP 802 may relay information in the EAP Response Identity frame 830 to an authentication server 806 via a RADIUS Access Request 832. The authentication server 806 may use the identity information in the RADIUS Access Request 832 to search a user database, and if an entry is found corresponding to the identity information, the authentication server 806 may encrypt a password in the corresponding entry with an MD5 challenge. The authentication server 806 may include the MD5 challenge in a RADIUS Access Challenge 834 that the authentication server 806 transmits to the AP 802.

The AP 802 may relay the MD5 challenge to the STA 804 in an EAP Request Challenge 836. The STA 804 may use the received MD5 challenge to encrypt an STA-accessible password, which the STA 804 may transmit to the AP 802 in an EAP Response Challenge 838. The AP 802 may relay the MD5 challenge-encrypted password to the authentication server 806 in a RADIUS Access Request 840. Upon receiving the RADIUS Access Request 840, the authentication server 806 may compare received encrypted password with its own MD5 challenge-encrypted password for the STA 804 and, if the two passwords are identical, the authentication server 806 authenticates the STA 804 and transmits a RADIUS Access Accept 842 to the AP 802.

In response to receiving the RADIUS Access Accept 842, the AP 802 may set a controlled port for the STA 804 in an authorized state so that the STA 804 is permitted to access the WLAN. Further, the AP 802 may generate a second aggregate frame 872 that includes both an EAP Success frame 844 and EPASN Negotiation frame 850. The EPASN Negotiation frame 850 included in the second aggregate frame 872 may include a second ephemeral key (or temporal key) of the AP 802, for which the AP 802 may have generated a matching private key, as well as base AKM parameters (if relevant).

The STA 804 and the AP 802 may derive a PMK 846 associated with the EPASN, and provided the information included in the EPASN Negotiation frame 850, in conjunction with the information included in the EPASN Initiation frame 848, the STA 804 may generate a PTK and a KEK (collectively, encryption keys 854). Further, the STA 804 may transmit an EPASN Confirmation frame 852 to the AP 802 that serves as a confirmation or acknowledgement of the EPASN key exchange. Upon receiving the EPASN Confirmation frame 852, the AP 802 may correspondingly derive the encryption keys 854, including the PTK and the KEK.

Having established the encryption keys 854 via EPASN contemporaneously with the authentication procedure via EAPoL, the STA 804 and the AP 802 may be configured to perform the association procedure with encrypted frames. Thus, the STA 804 may encrypt, and transmit to the AP 802, an association request 822. In response, the AP 802 may encrypt, and transmit to the STA 804, an association response 824. Accordingly, the STA 804 and the AP 802 may securely exchange user data.

Figure 9:
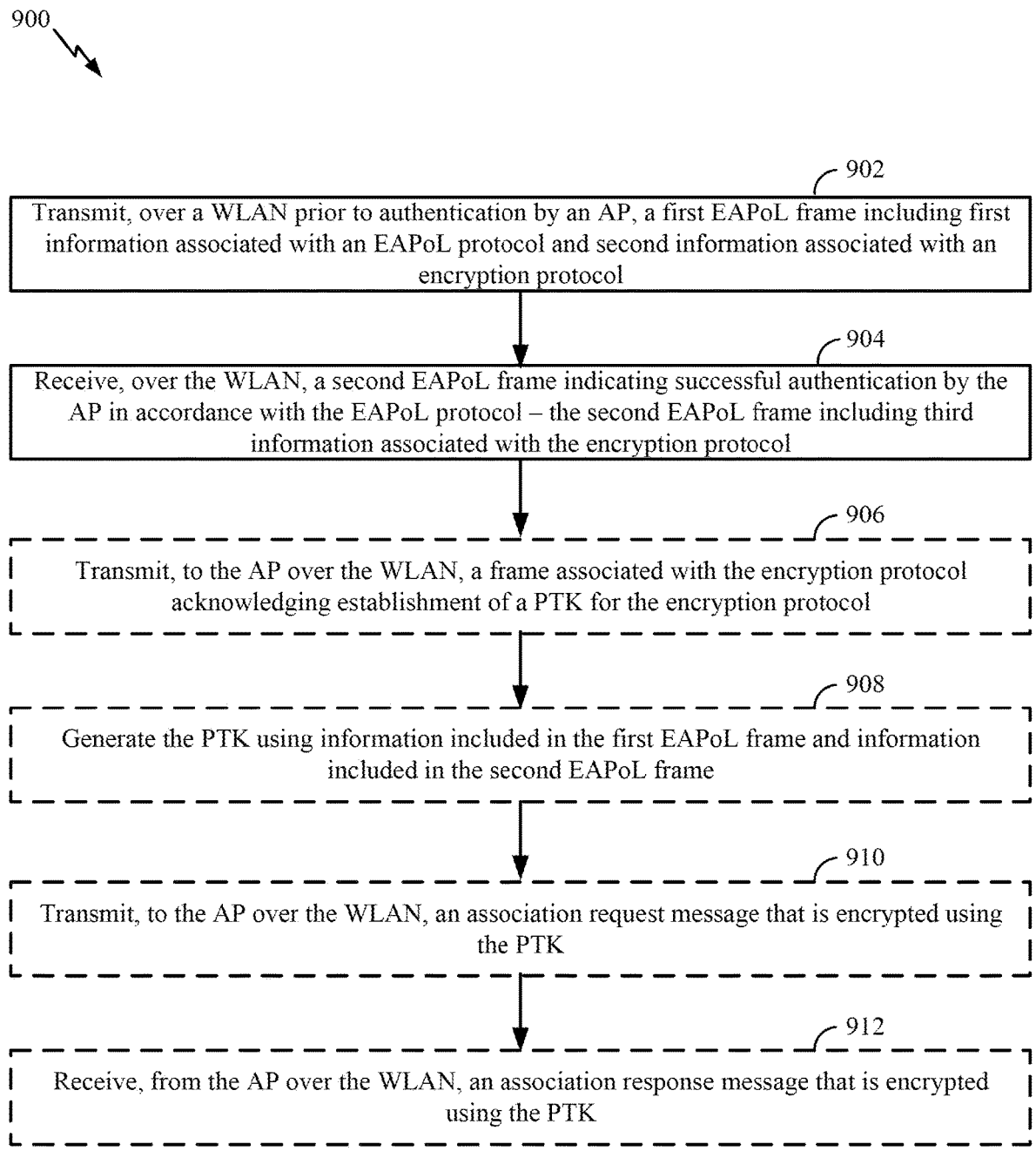
FIG. 9 shows a flowchart illustrating an example process for communicating information associated with an encryption protocol in frames configured to carry information associated with an authentication protocol.

FIG. 9 shows a flowchart illustrating an example process 900 for communicating information associated with an encryption protocol in frames configured to carry information associated with an authentication protocol. In some implementations, the process 900 may be performed by an STA, such as one of the STAs 104 of FIG. 1, the STA 504 of FIG. 5B, the STA 804 of FIG. 8.

In some implementations, the process 900 begins at block 902 with transmitting, over a WLAN prior to authentication by an AP, a first EAPoL frame including first information associated with an EAPoL protocol and second information associated with an encryption protocol. In some aspects, the first information includes a value corresponding to EAPoL Start and the second information includes a first ephemeral key associated with the encryption protocol. In some aspects, the encryption protocol includes a PASN protocol. In some aspects, the second information includes a value corresponding to a variation of the PASN protocol.

In the context of FIG. 5B, for example, block 902 may be performed by the WCD 515 and antennas 525. Instructions stored in memory 545 (and executed by application processor 535) may cause the WCD 515 and antennas 525 to perform block 902. In the context of FIG. 8, for example, the STA 804 may transmit, over a WLAN prior to authentication by the AP 802, the first aggregate frame 870 that includes the EAPoL Start frame 826 and the EPASN Initiation frame 848.

The process 900 includes a block 904 for receiving, over the WLAN, a second EAPoL frame indicating successful authentication by the AP in accordance with the EAPoL protocol. The second EAPoL frame may include third information associated with the encryption protocol. In some aspects, the third information includes a second ephemeral key associated with the encryption protocol. In some aspects, an association with the AP is unestablished when receiving the second EAPoL frame over the WLAN.

In the context of FIG. 5B, for example, block 904 may be performed by the WCD 515 and antennas 525. Instructions stored in memory 545 (and executed by application processor 535) may cause the WCD 515 and antennas 525 to perform block 904. In the context of FIG. 8, for example, the STA 804 may receive, over the WLAN from the AP 802, the second aggregate frame 872 that includes the EAPoL Success frame 844 and the EPASN Negotiation frame 850.

The process 900 may further include a block 906 for transmitting, to the AP over the WLAN, a frame associated with the encryption protocol acknowledging establishment of a PTK for the encryption protocol.

In the context of FIG. 5B, for example, block 906 may be performed by the WCD 515 and antennas 525. Instructions stored in memory 545 (and executed by application processor 535) may cause the WCD 515 and antennas 525 to perform block 906. In the context of FIG. 8, for example, the STA 804 may transmit, over the WLAN to the AP 802, the EPASN Confirmation frame 852.

The process 900 may further include a block 908 for generating the PTK using information included in the first EAPoL frame and information included in the second EAPoL frame. For example, the STA may generate a PMK using information included in one or both of the first EAPoL frame and/or the second EAPoL frame. From the first and second ephemeral keys, respectively included in the first and second EAPoL frames, and the PMK, the STA may derive the PTK.

In the context of FIG. 5B, for example, block 908 may be performed by the application processor 535, which may execute instructions stored in memory 545 for generating the PTK. In the context of FIG. 8, for example, the STA 804 may generate the PMK 846 and the encryption keys 854 based on information included in the first aggregate frame 870 (e.g., the first ephemeral key in the EPASN Initiation frame 848) and the second aggregate frame 872 (e.g., the second ephemeral key in the EPASN Confirmation frame 852).

The process 900 may further include a block 910 for transmitting, to the AP over the WLAN, an association request message that is encrypted using the PTK.

In the context of FIG. 5B, for example, block 910 may be performed by the WCD 515 and antennas 525. Instructions stored in memory 545 (and executed by application processor 535) may cause the WCD 515 and antennas 525 to perform block 910. In the context of FIG. 8, for example, the STA 804 may transmit, over the WLAN to the AP 802, the association request 822 that is encrypted using the encryption keys 854.

The process 900 may further include a block 912 for receiving, from the AP over the WLAN, an association response message that is encrypted using the PTK.

In the context of FIG. 5B, for example, block 912 may be performed by the WCD 515 and antennas 525. Instructions stored in memory 545 (and executed by application processor 535) may cause the WCD 515 and antennas 525 to perform block 912. In the context of FIG. 8, for example, the STA 804 may receive, over the WLAN to the AP 802, the association response 824 that is encrypted using the encryption keys 854.

Figure 10:
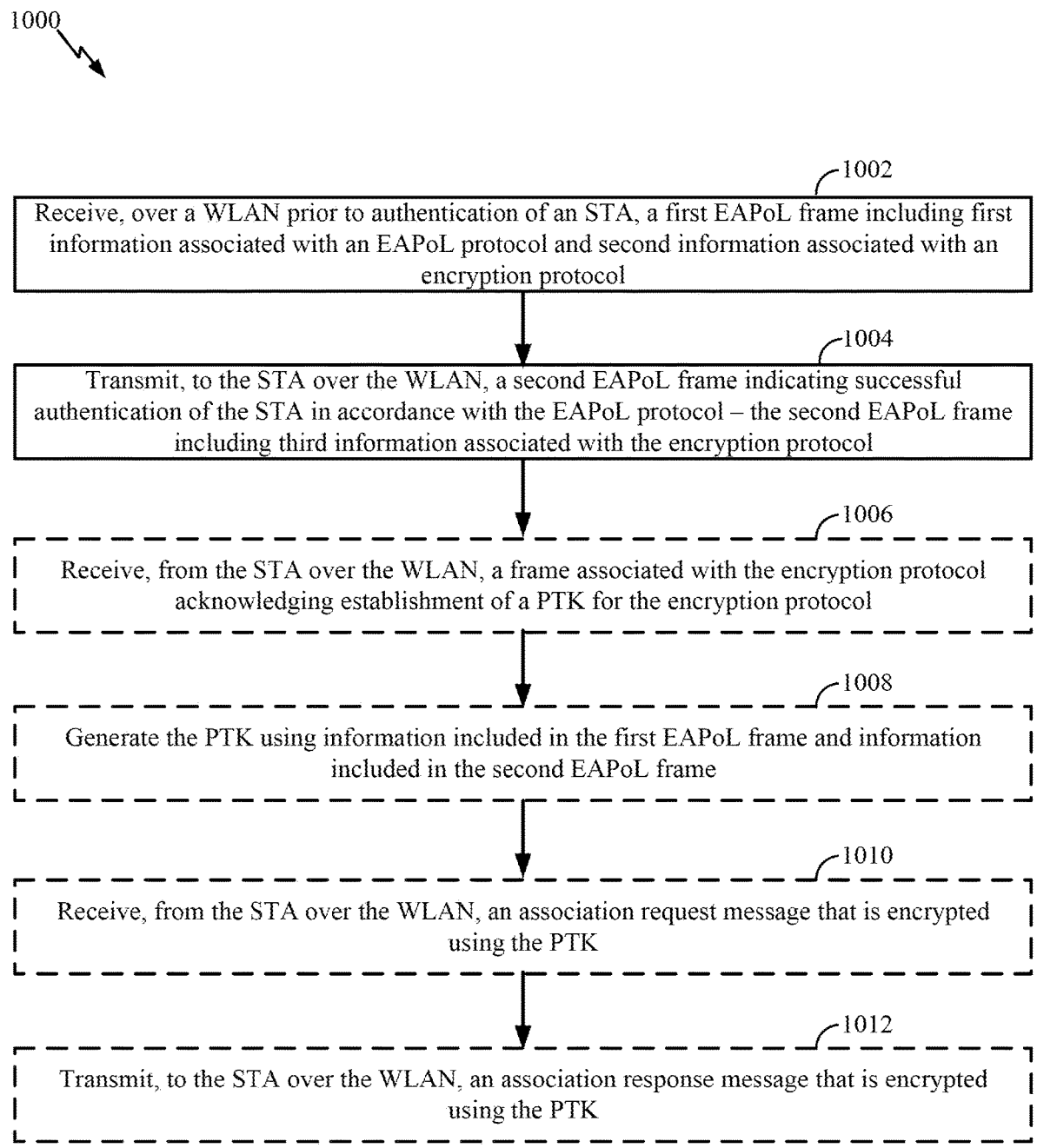
FIG. 10 shows a flowchart illustrating another example process for communicating information associated with an encryption protocol in frames configured to carry information associated with an authentication protocol.

FIG. 10 shows a flowchart illustrating another example process 1000 for communicating information associated with an encryption protocol in frames configured to carry information associated with an authentication protocol. In some implementations, the process 1000 may be performed by an AP, such as one of the AP 102 of FIG. 1, the AP 502 of FIG. 5A, the AP 802 of FIG. 8.

In some implementations, the process 1000 begins at block 1002 with receiving, over a WLAN prior to authentication of an STA, a first EAPoL frame including first information associated with an EAPoL protocol and second information associated with an encryption protocol. In some aspects, the first information includes a value corresponding to EAPoL Start and the second information includes a first ephemeral key associated with the encryption protocol. In some aspects, the second information includes a value corresponding to a variation of the PASN protocol.

In the context of FIG. 5A, for example, block 1002 may be performed by the WCD 510 and antennas 520. Instructions stored in memory 540 (and executed by application processor 530) may cause the WCD 510 and antennas 520 to perform block 1002. In the context of FIG. 8, for example, the AP 802 may receive, over the WLAN from the STA 804, the first aggregate frame 870 that includes the EAPoL Start frame 826 and the EPASN Initiation frame 848.

The process 1000 further includes a block 1004 for transmitting, to the STA over the WLAN, a second EAPoL frame indicating successful authentication of the STA in accordance with the EAPoL protocol. The second EAPoL frame may include third information associated with the encryption protocol. In some aspects, the third information includes a second ephemeral key associated with the encryption protocol. In some aspects, an association with the STA is unestablished when transmitting the second EAPoL frame over the WLAN.

In the context of FIG. 5A, for example, block 1004 may be performed by the WCD 510 and antennas 520. Instructions stored in memory 540 (and executed by application processor 530) may cause the WCD 510 and antennas 520 to perform block 1004. In the context of FIG. 8, for example, the AP 802 may transmit, over the WLAN to the STA 804, the second aggregate frame 872 that includes the EAPoL Success frame 844 and the EPASN Negotiation frame 850.

The process 1000 may further include a block 1006 for receiving, from the STA over the WLAN, a frame associated with the encryption protocol acknowledging establishment of a PTK for the encryption protocol.

In the context of FIG. 5A, for example, block 1006 may be performed by the WCD 510 and antennas 520. Instructions stored in memory 540 (and executed by application processor 530) may cause the WCD 510 and antennas 520 to perform block 1006. In the context of FIG. 8, for example, the AP 802 may receive, over the WLAN from the STA 804, the EPASN Confirmation frame 852.

The process 1000 may further include a block 1008 for generating the PTK using information included in the first EAPoL frame and information included in the second EAPoL frame. For example, the AP may generate a PMK using information included in one or both of the first EAPoL frame and/or the second EAPoL frame. From the first and second ephemeral keys, respectively included in the first and second EAPoL frames, and the PMK, the AP may derive the PTK.

In the context of FIG. 5A, for example, block 1008 may be performed by the application processor 530, which may execute instructions stored in memory 540 for generating the PTK. In the context of FIG. 8, for example, the AP 802 may generate the PMK 846 and the encryption keys 854 based on information included in the first aggregate frame 870 (e.g., the first ephemeral key in the EPASN Initiation frame 848) and the second aggregate frame 872 (e.g., the second ephemeral key in the EPASN Confirmation frame 852)).

The process 1000 may further include a block 1010 for receiving, from the STA over the WLAN, an association request message that is encrypted using the PTK.

In the context of FIG. 5A, for example, block 1010 may be performed by the WCD 510 and antennas 520. Instructions stored in memory 540 (and executed by application processor 530) may cause the WCD 510 and antennas 520 to perform block 1010. In the context of FIG. 8, for example, the AP 802 may receive, over the WLAN from the STA 804, the association request 822 that is encrypted using the encryption keys 854.

The process 1000 may further include a block 1012 for transmitting, to the STA over the WLAN, an association response message that is encrypted using the PTK.

In the context of FIG. 5A, for example, block 1012 may be performed by the WCD 510 and antennas 520. Instructions stored in memory 540 (and executed by application processor 530) may cause the WCD 510 and antennas 520 to perform block 1012. In the context of FIG. 8, for example, the AP 802 may transmit, over the WLAN to the STA 804, the association response 824 that is encrypted using the encryption keys 854.

Figure 11:
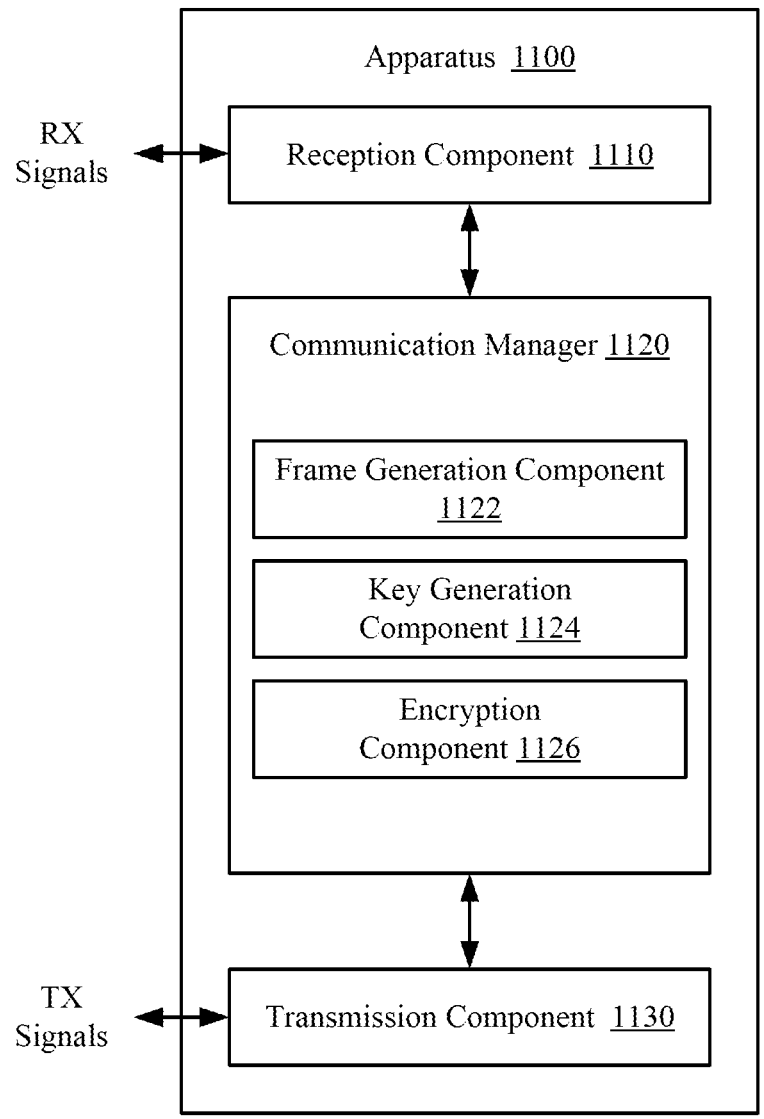
FIG. 11 shows a block diagram of an example apparatus.

FIG. 11 shows a block diagram of an example apparatus 1100, according to some implementations. In some implementations, the apparatus 1100 may be configured as an STA and/or may be configured to perform the process 900 described above with reference to FIG. 9. In some implementations, the apparatus 1100 may be a chip, SoC, chipset, package, circuitry, device, or system that includes at least one processor and at least one modem, such as a Wi-Fi or IEEE 802.11-compliant modem or a cellular modem.

In some aspects, the apparatus 1100 can be an example implementation of an STA, such as one of the STAs 104 described above with reference to FIG. 1, the STA 504 or WCD 515 described above with reference to FIG. 5B, or the STA 804 described above with reference to FIG. 8.

The apparatus 1100 includes a reception component 1110, a communication manager 1120, and a transmission component 1130. The communication manager 1120 further includes a frame generation component 1122, a key generation component 1124, and an encryption component 1126. In some aspects, portions of one or more of the components 1122, 1124, 1126 may be implemented at least in part in hardware or firmware. In some implementations, at least one of the components 1122, 1124, 1126 is implemented at least in part as software stored in a memory, such as the memory 408 of FIG. 4 or the memory 545 of FIG. 5B. For example, portions of one or more of the components 1122, 1124, 1126 may be implemented as instructions or computer-executable code (which may be stored on a non-transitory, computer-readable medium) executable by a processor (such as the processor 406 of FIG. 4 or the application processor 535 of FIG. 5B) to perform the functions or operations of the respective one of the component 1122, 1124, 1126.

The reception component 1110 is configured to receive RX signals, over a wireless channel, from at least one AP. The transmission component 1130 is configured to transmit TX signals, over a wireless channel, to at least one AP. The communication manager 1120 is configured to control or manage communications with at least one AP.

In some implementations, the frame generation component 1122 may generate a first EAPoL frame including first information associated with an EAPoL protocol and second information associated with an encryption protocol. In some aspects, the first information includes a value corresponding to EAPoL Start and the second information includes a first ephemeral key associated with the encryption protocol. In some aspects, the encryption protocol includes a PASN protocol. In some aspects, the second information includes a value corresponding to a variation of the PASN protocol.

The frame generation component 1122 may output the first EAPoL frame for transmission to an AP over a WLAN. In some aspects, the frame generation component 1122 may include an interface, such as an interface of a processor, a protocol interface, or another interface enabling a frame having a header to be output for wireless transmission, such as by packetizing, encoding, or modulating the frame with the header for wireless transmission via an antenna(s) of the apparatus 1100. The transmission component 1130 may transmit the first EAPoL frame over a WLAN prior to authentication by an AP.

The reception component 1110 may receive, over the WLAN, a second EAPoL frame indicating successful authentication by the AP in accordance with the EAPoL protocol. The second EAPoL frame may include third information associated with the encryption protocol. In some aspects, the third information includes a second ephemeral key associated with the encryption protocol. In some aspects, an association with the AP is unestablished when receiving the second EAPoL frame over the WLAN.

The frame generation component 1122 may generate a frame associated with the encryption protocol acknowledging establishment of a PTK for the encryption protocol. The frame generation component 1122 may output the frame for transmission, and the transmission component 1130 may transmit the frame to the AP over the WLAN.

The key generation component 1124 may generate the PTK using information included in the first EAPoL frame and information included in the second EAPoL frame.

The frame generation component 1122 may generate an association request message. The encryption component 1126 may encrypt the association request message using the PTK. The transmission component 1130 may transmit the encrypted association request message to the AP over the WLAN.

The reception component 1110 may receive, from the AP over the WLAN, an association response message that is encrypted using the PTK. The encryption component 1126 may decrypt the association response message using the PTK.

Figure 12:
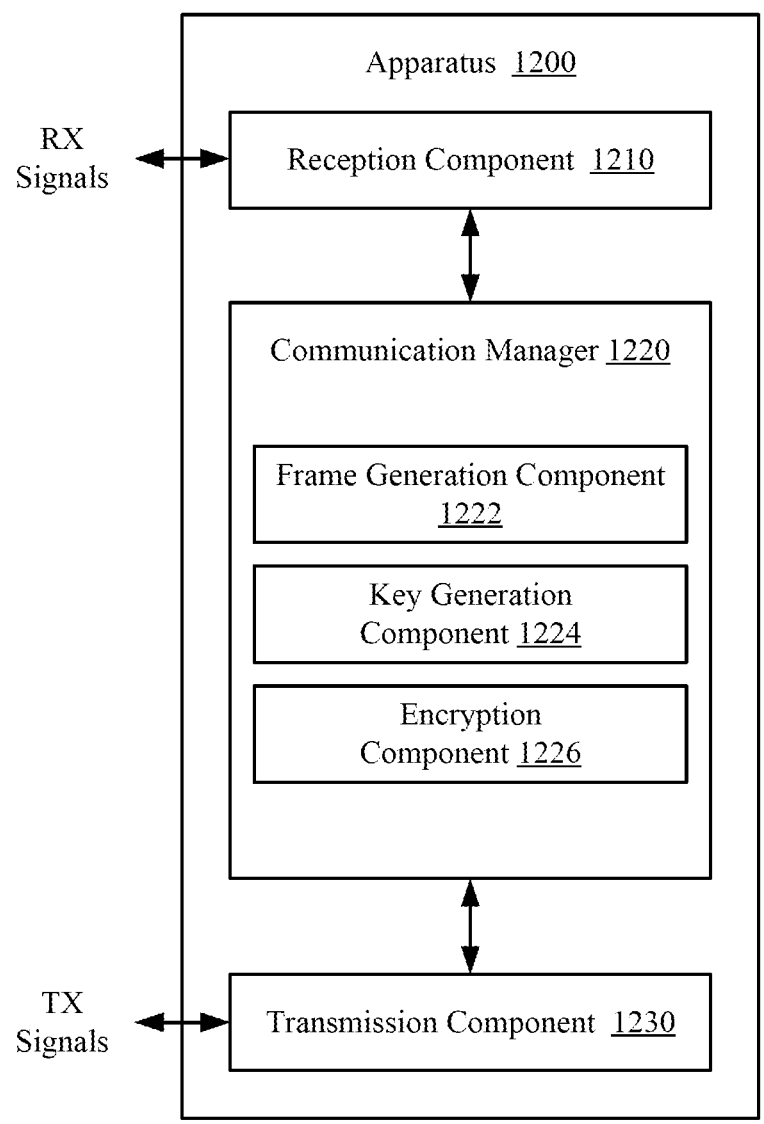
FIG. 12 shows a block diagram of another example apparatus.

FIG. 12 shows a block diagram of another example apparatus 1200, according to some implementations. In some implementations, the apparatus 1200 is configured to perform the process 1000 described above with reference to FIG. 10. In some implementations, the apparatus 1200 may be a chip, SoC, chipset, package, circuitry, device, or system that includes at least one processor and at least one modem, such as a Wi-Fi or IEEE 802.11—compliant modem or a cellular modem.

In some aspects, the apparatus 1200 can be an example implementation of an AP, such as the AP 102 described above with reference to FIG. 1, the AP 502 or WCD 510 described above with reference to FIG. 5A, or the AP 802 described above with reference to FIG. 8.

The apparatus 1200 includes a reception component 1210, a communication manager 1220, and a transmission component 1230. The communication manager 1220 further includes a frame generation component 1222, a key generation component 1224, and an encryption component 1226. In some aspects, portions of one or more of the components 1222, 1224, 1226 may be implemented at least in part in hardware or firmware. In some implementations, at least one of the components 1222, 1224, 1226 is implemented at least in part as software stored in a memory, such as the memory 408 of FIG. 4 or the memory 540 of FIG. 5A. For example, portions of one or more of the components 1222, 1224, 1226 may be implemented as instructions or computer-executable code (which may be stored on a non-transitory, computer-readable medium) executable by a processor (such as the processor 406 of FIG. 4 or the application processor 530 of FIG. 5A) to perform the functions or operations of the respective one of the component 1222, 1224, 1226.

The reception component 1210 is configured to receive RX signals, over a wireless channel, from at least STA. The transmission component 1230 is configured to transmit TX signals, over a wireless channel, to at least one STA. The communication manager 1220 is configured to control or manage communications with at least one STA.

In some implementations, the reception component 1210 receives, over a WLAN prior to authentication of an STA, a first EAPoL frame including first information associated with an EAPoL protocol and second information associated with an encryption protocol. In some aspects, the first information includes a value corresponding to EAPoL Start and the second information includes a first ephemeral key associated with the encryption protocol. In some aspects, the second information includes a value corresponding to a variation of the PASN protocol.

The frame generation component 1222 may generate a second EAPoL frame indicating successful authentication of the STA in accordance with the EAPoL protocol. The second EAPoL frame may include third information associated with the encryption protocol. In some aspects, the third information includes a second ephemeral key associated with the encryption protocol. The transmission component 1230 may transmit the second EAPoL frame to the STA over the WLAN. In some aspects, an association with the STA is unestablished when transmitting the second EAPoL frame over the WLAN.

The reception component 1210 may receive, from the STA over the WLAN, a frame associated with the encryption protocol acknowledging establishment of a PTK for the encryption protocol.

The key generation component 1224 may generate the PTK using information included in the first EAPoL frame and information included in the second EAPoL frame.

The reception component 1210 may receive, from the STA over the WLAN, an association request message that is encrypted using the PTK. The encryption component 1226 may decrypt the association request message using the PTK.

The frame generation component 1222 may generate an association response message, and the encryption component 1226 may encrypt the association response message using the PTK. The transmission component 1230 may transmit the association response message to the STA over the WLAN.

Implementation examples are described in the following numbered clauses:

1. A method of wireless communication at an STA, including:
    transmitting, over a WLAN prior to authentication by an AP, a first EAPoL frame including first information associated with an EAPoL protocol and second information associated with an encryption protocol; and
    receiving, over the WLAN, a second EAPoL frame indicating successful authentication by the AP in accordance with the EAPoL protocol, the second EAPoL frame including third information associated with the encryption protocol.
2. The method of clause 1, and the first information includes a value corresponding to EAPoL Start, the second information includes a first ephemeral key associated with the encryption protocol, and the third information includes a second ephemeral key associated with the encryption protocol.
3. The method of any of clauses 1 or 2, and the encryption protocol includes a PASN protocol.
4. The method of clause 3, and the second information includes a value corresponding to a variation of the PASN protocol.
5. The method of any of clauses 1 to 4, and an association with the AP is unestablished when receiving the second EAPoL frame over the WLAN.
6. The method of any of clauses 1 to 5, further including:
    transmitting, to the AP over the WLAN, a frame associated with the encryption protocol acknowledging establishment of a PTK for the encryption protocol.
7. The method of clause 6, further including:
    generating the PTK using information included in the first EAPoL frame and information included in the second EAPoL frame.
8. The method of any of clauses 6 or 7, further including:
    transmitting, to the AP over the WLAN, an association request message that is encrypted using the PTK; and
    receiving, from the AP over the WLAN, an association response message that is encrypted using the PTK.
9. A method of wireless communication at an AP, including:
    receiving, over a WLAN prior to authentication of a STA, a first EAPoL frame including first information associated with an EAPoL protocol and second information associated with an encryption protocol; and
    transmitting, to the STA over the WLAN, a second EAPoL frame indicating successful authentication of the STA in accordance with the EAPoL protocol, the second EAPoL frame including third information associated with the encryption protocol.
10. The method of clause 9, and the first information includes a value corresponding to EAPoL Start, the second information includes a first ephemeral key associated with the encryption protocol, and the third information includes a second ephemeral key associated with the encryption protocol.
11. The method of any of clauses 9 or 10, and the encryption protocol includes a PASN protocol.
12. The method of clause 11, and the second information includes a value corresponding to a variation of the PASN protocol.
13. The method of any of clauses 9 to 12, and an association with the STA is unestablished when transmitting the second EAPoL frame over the WLAN.
14. The method of any of clauses 9 to 13, further including:
    receiving, from the STA over the WLAN, a frame associated with the encryption protocol acknowledging establishment of a PTK for the encryption protocol.
15. The method of clause 14, further including:
    generating the PTK using information included in the first EAPoL frame and information included in the second EAPoL frame.
16. The method of any of clauses 14 or 15, further including:
    receiving, from the STA over the WLAN, an association request message that is encrypted using the PTK; and
    transmitting, to the STA over the WLAN, an association response message that is encrypted using the PTK.
17. An apparatus configured for wireless communication at an STA, the apparatus including:
    a processing system having a memory storing instructions configured to cause the STA to generate a first EAPoL frame including first information associated with an EAPoL protocol and second information associated with an encryption protocol;
    a first interface configured to output the first EAPoL frame for transmission over a WLAN prior to authentication by an AP; and
    a second interface configured to obtain a second EAPoL frame indicating successful authentication by the AP in accordance with the EAPoL protocol, the second EAPoL frame including third information associated with the encryption protocol.
18. The apparatus of clause 17, and the first information includes a value corresponding to EAPoL Start, the second information includes a first ephemeral key associated with the encryption protocol, and the third information includes a second ephemeral key associated with the encryption protocol.
19. The apparatus of any of clauses 17 or 18, and the encryption protocol includes a PASN protocol.
20. The apparatus of clause 19, and the second information includes a value corresponding to a variation of the PASN protocol.
21. The apparatus of any of clauses 17 to 20, and an association with the AP is unestablished when the second EAPoL frame is obtained.
22. The apparatus of any of clauses 17 to 21, and the first interface is further configured to output a frame associated with the encryption protocol acknowledging establishment of a PTK for the encryption protocol.
23. The apparatus of clause 22, and the processing system is further configured to generate the PTK using information included in the first EAPoL frame and information included in the second EAPoL frame.
24. The apparatus of any of clauses 22 or 23, and the first interface is further configured to output, for transmission to the AP over the WLAN, an association request message that is encrypted using the PTK, and the second interface is further configured to obtain an association response message, received from the AP over the WLAN, that is encrypted using the PTK.
25. An apparatus configured for wireless communication at an AP, including:
a first interface configured to obtain a first EAPoL frame, received over a WLAN prior to authentication of a STA, including first information associated with an EAPoL protocol and second information associated with an encryption protocol;
a processing system having a memory storing instructions configured to cause the AP to generate a second EAPoL frame that indicates successful authentication of the STA in accordance with the EAPoL protocol and that includes third information associated with the encryption protocol; and
a second interface configured to output the second EAPoL frame for transmission to the STA over the WLAN.
26. The apparatus of clause 25, and the first information includes a value corresponding to EAPoL Start, the second information includes a first ephemeral key associated with the encryption protocol, and the third information includes a second ephemeral key associated with the encryption protocol.
27. The apparatus of any of clauses 25 or 26, and the encryption protocol includes a PASN protocol.
28. The apparatus of clause 27, and the second information includes a value corresponding to a variation of the PASN protocol.
29. The apparatus of any of clauses 25 to 28, and an association with the STA is unestablished when transmitting the second EAPoL frame over the WLAN.
30. The apparatus of any of clauses 25 to 29, and the first interface is further configured to obtain a frame, received from the STA over the WLAN, that is associated with the encryption protocol acknowledging establishment of a PTK for the encryption protocol.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:
1. A method of wireless communication at a station (STA), comprising:

transmitting, over a wireless local area network (WLAN) prior to authentication by an access point (AP), a first Extensible Authentication Protocol Over a Local Area Network (EAPOL) frame including first information associated with an EAPOL protocol and second information associated with an encryption protocol; and receiving, over the WLAN, a second EAPOL frame indicating successful authentication by the AP in accordance with the EAPOL protocol, the second EAPOL frame including third information associated with the encryption protocol.

2. The method of claim 1, wherein the first information comprises a value corresponding to EAPOL Start, the second information comprises a first ephemeral key associated with the encryption protocol, and the third information comprises a second ephemeral key associated with the encryption protocol.

3. The method of claim 1, wherein the encryption protocol comprises a Pre-Association Security Negotiation (PASN) protocol.

4. The method of claim 3, wherein the second information comprises a value corresponding to a variation of the PASN protocol.

5. The method of claim 1, wherein an association with the AP is unestablished when receiving the second EAPOL frame over the WLAN.

6. The method of claim 1, further comprising:
transmitting, to the AP over the WLAN, a frame associated with the encryption protocol acknowledging establishment of a pairwise transient key (PTK) for the encryption protocol.

7. The method of claim 6, further comprising:
generating the PTK using information included in the first EAPOL frame and information included in the second EAPOL frame.

8. The method of claim 6, further comprising:
transmitting, to the AP over the WLAN, an association request message that is encrypted using the PTK; and
receiving, from the AP over the WLAN, an association response message that is encrypted using the PTK.

9. A method of wireless communication at an access point (AP), comprising:
receiving, over a wireless local area network (WLAN) prior to authentication of a station (STA), a first Extensible Authentication Protocol Over a Local Area Network (EAPOL) frame including first information associated with an EAPOL protocol and second information associated with an encryption protocol; and
transmitting, to the STA over the WLAN, a second EAPOL frame indicating successful authentication of the STA in accordance with the EAPOL protocol, the second EAPOL frame including third information associated with the encryption protocol.

10. The method of claim 9, wherein the first information comprises a value corresponding to EAPOL Start, the second information comprises a first ephemeral key associated with the encryption protocol, and the third information comprises a second ephemeral key associated with the encryption protocol.

11. The method of claim 9, wherein the encryption protocol comprises a Pre-Association Security Negotiation (PASN) protocol.

12. The method of claim 11, wherein the second information comprises a value corresponding to a variation of the PASN protocol.

13. The method of claim 9, wherein an association with the STA is unestablished when transmitting the second EAPOL frame over the WLAN.

14. The method of claim 9, further comprising:
receiving, from the STA over the WLAN, a frame associated with the encryption protocol acknowledging establishment of a pairwise transient key (PTK) for the encryption protocol.

15. The method of claim 14, further comprising:
generating the PTK using information included in the first EAPOL frame and information included in the second EAPOL frame.

16. The method of claim 14, further comprising:
receiving, from the STA over the WLAN, an association request message that is encrypted using the PTK; and
transmitting, to the STA over the WLAN, an association response message that is encrypted using the PTK.

17. An apparatus configured for wireless communication at a station (STA), the apparatus comprising:
a processing system having a memory storing instructions configured to cause the STA to generate a first Extensible Authentication Protocol Over a Local Area Network (EAPOL) frame including first information associated with an EAPOL protocol and second information associated with an encryption protocol;
a first interface configured to output the first EAPOL frame for transmission over a wireless local area network (WLAN) prior to authentication by an access point (AP); and
a second interface configured to obtain a second EAPOL frame indicating successful authentication by the AP in accordance with the EAPOL protocol, the second EAPOL frame including third information associated with the encryption protocol.

18. The apparatus of claim 17, wherein the first information comprises a value corresponding to EAPOL Start, the second information comprises a first ephemeral key associated with the encryption protocol, and the third information comprises a second ephemeral key associated with the encryption protocol.

19. The apparatus of claim 17, wherein the encryption protocol comprises a Pre-Association Security Negotiation (PASN) protocol.

20. The apparatus of claim 19, wherein the second information comprises a value corresponding to a variation of the PASN protocol.

21. The apparatus of claim 17, wherein an association with the AP is unestablished when the second EAPOL frame is obtained.

22. The apparatus of claim 17, wherein the first interface is further configured to output a frame associated with the encryption protocol acknowledging establishment of a pairwise transient key (PTK) for the encryption protocol.

23. The apparatus of claim 22, wherein the processing system is further configured to generate the PTK using information included in the first EAPOL frame and information included in the second EAPOL frame.

24. The apparatus of claim 22, wherein the first interface is further configured to output, for transmission to the AP over the WLAN, an association request message that is encrypted using the PTK, and wherein the second interface is further configured to obtain an association response message, received from the AP over the WLAN, that is encrypted using the PTK.

25. An apparatus configured for wireless communication at an access point (AP), comprising:

a first interface configured to obtain a first Extensible Authentication Protocol Over a Local Area Network (EAPOL) frame, received over a wireless local area network (WLAN) prior to authentication of a station (STA), including first information associated with an EAPOL protocol and second information associated with an encryption protocol;

a processing system having a memory storing instructions configured to cause the AP to generate a second EAPOL frame that indicates successful authentication of the STA in accordance with the EAPOL protocol and that includes third information associated with the encryption protocol; and a second interface configured to output the second EAPOL frame for transmission to the STA over the WLAN.

26. The apparatus of claim 25, wherein the first information comprises a value corresponding to EAPOL Start, the second information comprises a first ephemeral key associated with the encryption protocol, and the third information comprises a second ephemeral key associated with the encryption protocol.

27. The apparatus of claim 25, wherein the encryption protocol comprises a Pre-Association Security Negotiation (PASN) protocol.

28. The apparatus of claim 27, wherein the second information comprises a value corresponding to a variation of the PASN protocol.

29. The apparatus of claim 25, wherein an association with the STA is unestablished when transmitting the second EAPOL frame over the WLAN.

30. The apparatus of claim 25, wherein the first interface is further configured to obtain a frame, received from the STA over the WLAN, that is associated with the encryption protocol acknowledging establishment of a pairwise transient key (PTK) for the encryption protocol.

* * * * *